US012350849B2

(12) United States Patent
Arndt et al.

(10) Patent No.: US 12,350,849 B2
(45) Date of Patent: Jul. 8, 2025

(54) HAIR TRIMMER HOUSING WITH ENHANCED MOTOR MOUNT

(71) Applicant: WAHL CLIPPER CORPORATION, Sterling, IL (US)

(72) Inventors: Steven Arndt, Geneseo, IL (US); Nathaniel Craig, Walnut, IL (US); Daniel Saathoff, Sterling, IL (US)

(73) Assignee: WAHL CLIPPER CORPORATION, Sterling, IL (US)

( * ) Notice: Subject to any disclaimer, the term of this patent is extended or adjusted under 35 U.S.C. 154(b) by 377 days.

(21) Appl. No.: 17/937,145

(22) Filed: Sep. 30, 2022

(65) Prior Publication Data

US 2024/0109213 A1 Apr. 4, 2024

(51) Int. Cl.
*B26B 19/38* (2006.01)
*B26B 19/06* (2006.01)

(52) U.S. Cl.
CPC .......... *B26B 19/3866* (2013.01); *B26B 19/06* (2013.01); *B26B 19/386* (2013.01)

(58) Field of Classification Search
CPC ............ B26B 19/3853; B26B 19/3873; B26B 19/3866; B26B 19/386; B26B 19/06
USPC .......................................................... 30/196
See application file for complete search history.

(56) References Cited

U.S. PATENT DOCUMENTS 2,186,122 A 1/1940 Rand, Jr.
2,910,770 A * 11/1959 Kachline ................. B26B 19/38 30/43.92
5,568,688 A 10/1996 Andrews
8,677,627 B2 3/2014 Li et al.
8,806,757 B2 8/2014 Moseman
9,545,729 B2 1/2017 Buck, Jr. et al.
10,272,578 B2 4/2019 Johnson
2009/0165303 A1 7/2009 Burgess et al.
2021/0291389 A1 9/2021 Buck, Jr.

FOREIGN PATENT DOCUMENTS

CN 201931478 U 8/2011
CN 212372231 U 1/2021
CN 212601970 U 2/2021
CN 112776008 A * 5/2021
CN 113134850 A 7/2021
CN 215241001 U 12/2021
CN 216699685 U * 6/2022
(Continued)

OTHER PUBLICATIONS

CN-112776008-A, Translation (Year: 2025).*
(Continued)

*Primary Examiner* — Nhat Chieu Q Do
(74) *Attorney, Agent, or Firm* — Greer, Burns & Crain, Ltd

(57) ABSTRACT

A hair clipper is provided, including a clipper housing defining a longitudinal housing axis, having a drive end and including a first housing half and a second housing half, each of the halves having a front end associated with the drive end and an opposite rear end, and each front end defining an attachment formation. Upon assembly of the clipper housing halves, the first and second housing halves are constructed so that the attachment formations are overlapping and are secured using fasteners inserted along a longitudinal axis parallel to the longitudinal housing axis.

9 Claims, 14 Drawing Sheets

(56) References Cited

FOREIGN PATENT DOCUMENTS

| | | |
|---|---|---|
| CN | 217620714 U | 10/2022 |
| JP | 3017142 U | 10/1995 |

OTHER PUBLICATIONS

CN-216699685-U, Translation (Year: 2005).*

Invitation to Pay Additional Fees received in PCT/US2023/030340, mailed Oct. 17, 2023.

International Search Report and Written Opinion received for PCT/US2023/030340, mailed Feb. 28, 2024.

Wahl Clipper Corporation, Product Description for "Aqua Blade Rechargeable Wet Dry Lithium Ion Deluxe Trimming Kit with 4 Interchangeable Heads for Shaving, Detailing, & Grooming Beards, Mustaches, Stubble, Ear, Nose, & Body—Model 9899-100," retrieved from http://www.amazon.com on Feb. 25, 2021, 5 pages.

Taotuo, Product Description for "Professional Hair Clippers Trimmer for Men T Blade Trimmer, Pro Li Outline Clippers, Cordless Barber Hair Clipper, Zero Gapped Detail Stainless Blade Bald Head Beard Shaver Barber Shop," Tiupa Pro Li Trimmer, retrieved from http://www.amazon.com on Feb. 25, 2021, 4 pages.

* cited by examiner

HAIR TRIMMER HOUSING WITH ENHANCED MOTOR MOUNT

BACKGROUND

The present invention relates generally to electric hair clippers and trimmers, collectively referred to here as hair clippers, and more specifically to such devices used for achieving precision and detailed trimming styles on the customer's scalp and/or face, or trimming nose and ear hair, and which are intended for operation while the user is showering or bathing.

Modern hair grooming is more popular and often features design elements cut into the customer's hair down to the skin. These design elements take a variety of forms including, but not limited to well-defined edges for facial hair, geometric designs, freeform patterns, images of animals, text and the like. Also, modern grooming includes maintenance for areas like nose and ear hair. Precision grooming is often challenging to home hair groomers using conventional electric hair clippers, where it is often difficult to simultaneously view the cutting blade and target cutting area, since traditional hair clippers have housings that extend to the bladeset cutting teeth. As such, the housing often obscures the view of the cutting area, making it difficult to achieve precision.

Hair clipper manufacturers have addressed this need by providing specialized outliner trimmers (in the present application, hair clippers and hair trimmers are collectively referred to as hair clippers, and are contemplated for use on both humans and animals) which have an exposed bladeset positioned axially from an end of the housing for enhancing the hair groomer or stylist's view of the cutting area. Designers of such outliner trimmers or clippers are forced to balance the often competing demands of enhanced visibility of the cutting area and the requirement for stabilized mechanical and electrical connection of the bladeset to the clipper drive system.

Still another challenge to hair grooming, besides creating precision modern hairstyles with such design shapes, is that the customer often wants to take the hair clipper into the bath or shower to perform the grooming operation, or even to be able to rinse the clipper under a tap for cleaning. As such, manufacturers of clippers need to protect their products from damage due to exposure to water.

One approach to providing a water-resistant hair clipper is disclosed in commonly-owned U.S. patent application Ser. No. 17/241,895, the contents of which are incorporated by reference herein. A clipper motor pod with chassis is encased in a tube of shrink-wrap plastic, and are provided with end seals to prevent entry of water to the motor and the clipper control system.

A challenge for manufacturing such an encapsulated motor pod structure is fastening the pod to the housing in a way that secures the pod in place during operation without piercing the water-resistant encapsulating membrane. It has been found that an encapsulated vibrating clipper motor pod has the tendency to both rotate about a longitudinal axis and also to move linearly along the longitudinal axis relative to the clipper housing.

Accordingly, there is a need for an improved hair clipper which addresses the above-listed design consideration, including securing an encapsulated clipper motor pod within a clipper housing without piercing the waterproof membrane.

SUMMARY

The above-listed need is met or exceeded by the present hair clipper housing with enhanced motor mount. One feature of the present hair clipper housing is a fastening arrangement that is configured so that the respective clamshell clipper housing halves are secured together at at least one end by fasteners inserted along an axis parallel to a longitudinal axis of the clipper housing. This arrangement enables the housing to be secured together without the use of conventional vertical bosses oriented perpendicular to the longitudinal clipper axis. Accordingly, the resulting reduced housing profile at least near the clipper bladeset enhances blade visibility compared to conventional clipper housings.

Another feature of the present hair clipper housing is a configuration designed to securely retain an encapsulated motor pod without piercing the water-resistant encapsulation membrane. The motor pod is provided with a chassis having a pod attachment formation adjacent the offset cam used to drive the hair clipper bladeset. As the housing halves are assembled about the encapsulated motor pod, each of first and second housing halves have locking formations that engage the pod attachment formation so as to prevent movement of the motor pod relative to the assembled housing in both a rotational and a linear direction.

In a preferred embodiment, the chassis pod attachment formation is provided in the form of a semi-circular keying protrusion. Included on the keying protrusion is a vertically positioned, semicircular flange axially spaced from the chassis to form a groove. A second, lower housing half has a semi-circular cradle formation configured for engaging the groove. A first, upper housing half has a pair of shoulders that engage ends of the flange, and upon the first and second housing halves being secured together, the shoulders prevent the pod from rotating, and the engagement of the groove with the cradle prevents axial movement of the pod in the housing. Also, attachment of the first and second housing halves using the fasteners oriented parallel to the longitudinal axis of the clipper as described above secures the two housing halves together and also capture the encapsulated pod.

Still further features of the present hair clipper include features on the motor chassis to more securely retain the motor, a battery and a control system circuit board to the chassis. In a preferred embodiment, these features take the form of integral tabs or protrusions that retain at least the motor, but also a rechargeable battery and the circuit board to the chassis.

A front seal plate of the chassis provides a front attachment point for the encapsulating tube as it is heat sealed, and also forms a base for the semi-circular keying protrusion. A rear seal plate of the chassis provides a rear attachment point for the encapsulating tube as it is heat sealed, and also defines a polygonal shaped charging cowl that is retained by the juncture of the first and second housing halves to also retain the pod in place in the housing against operation-induced movement. In addition to the encapsulating tube, which forms an outer motor seal, the present clipper is provided with a resilient inner tube surrounding at least a drive end of the motor to form an inner motor seal.

More specifically, a hair clipper is provided, including a clipper housing defining a longitudinal housing axis, having a drive end and including a first housing half and a second housing half, each of the halves having a front end associated with the drive end and an opposite rear end, and each front end defining an attachment formation.

Upon assembly of the clipper housing halves, the first and second housing halves are constructed so that the attachment formations are overlapping and are secured using fasteners inserted along a longitudinal axis parallel to the longitudinal housing axis.

In an embodiment, the clipper includes a chassis configured for securing a motor, a battery and a control system, a radially enlarged flange at each of the ends. A tubular sleeve of heat deformable plastic film is provided, being dimensioned for slidingly surrounding the chassis and extending axially at least to the flanges, such that upon application of heat, the sleeve deforms around the chassis, the motor, the battery and the control system, and forms a sealed motor pod. The chassis includes a pod attachment formation configured for being engaged by the attachment formations of the first and second housing halves for preventing movement of the pod relative to the housing upon assembly of the first and second housing halves.

In an embodiment, each of the first and second housing halves have locking formations that engage the pod attachment formation to prevent movement of the motor pod relative to the assembled housing in both a rotational and a linear direction. Preferably, attachment of the first and second housing halves using the fasteners oriented parallel to the longitudinal axis of the clipper secure the two housing halves together and also capture the encapsulated motor pod. Also, the attachment formations on the first and second housing halves near the bladeset are constructed and arranged to lack fastener bosses projecting perpendicular to the longitudinal housing axis.

In an embodiment, the chassis pod attachment formation is provided in the form of a semi-circular keying protrusion having a vertically projecting semicircular flange axially spaced from the chassis to form a groove. Also, the second housing half has a semi-circular cradle formation configured for engaging the groove, and the first housing half has a pair of shoulders that engage ends of the flange, and upon the first and second housing halves being secured together, the shoulders prevent the motor pod from rotating, and the engagement of the groove with the cradle prevents axial movement of the motor pod in the housing.

In an embodiment the encapsulating tube forms an outer motor seal, and the clipper is provided with a further inner motor seal surrounding at least a drive end of the motor. Also, the chassis preferably includes integral tabs configured for retaining at least one of the motor and the battery to said chassis.

In an embodiment, a front seal plate or flange of the chassis provides a front attachment point for the encapsulating tube upon heat sealing, and also forms a base for the semi-circular keying protrusion, and a rear seal plate or flange of the chassis provides a rear attachment point for the encapsulating tube upon heat sealing, the rear seal plate defines a polygonal shaped charging cowl configured for being retained by the juncture of the first and second housing halves to retain the motor pod in place in the housing against operation-induced movement.

In an embodiment, formations on the first and second housing halves are included for retaining a rear end of the motor pod from movement relative to the housing upon assembly of said first and second halves.

In another embodiment, a hair clipper is provided, including, a clipper housing defining a longitudinal housing axis, having a drive end and including a first housing half and a second housing half, each of the halves having a front end associated with the drive end and an opposite rear end, each front end defining an attachment formation. A chassis is configured for securing a motor, a battery and a control system, a radially enlarged flange at each of the ends. A tubular sleeve of heat deformable plastic film is dimensioned for slidingly surrounding the chassis and extending axially at least to the flanges, such that upon application of heat, the sleeve deforms around the chassis, motor, battery and control system, and forms a sealed motor pod. Included on the chassis is a pod attachment formation configured for being engaged by the attachment formations of the first and second housing halves for preventing movement of the pod relative to the housing upon assembly of the first and second housing halves.

DETAILED DESCRIPTION

Figure 1:
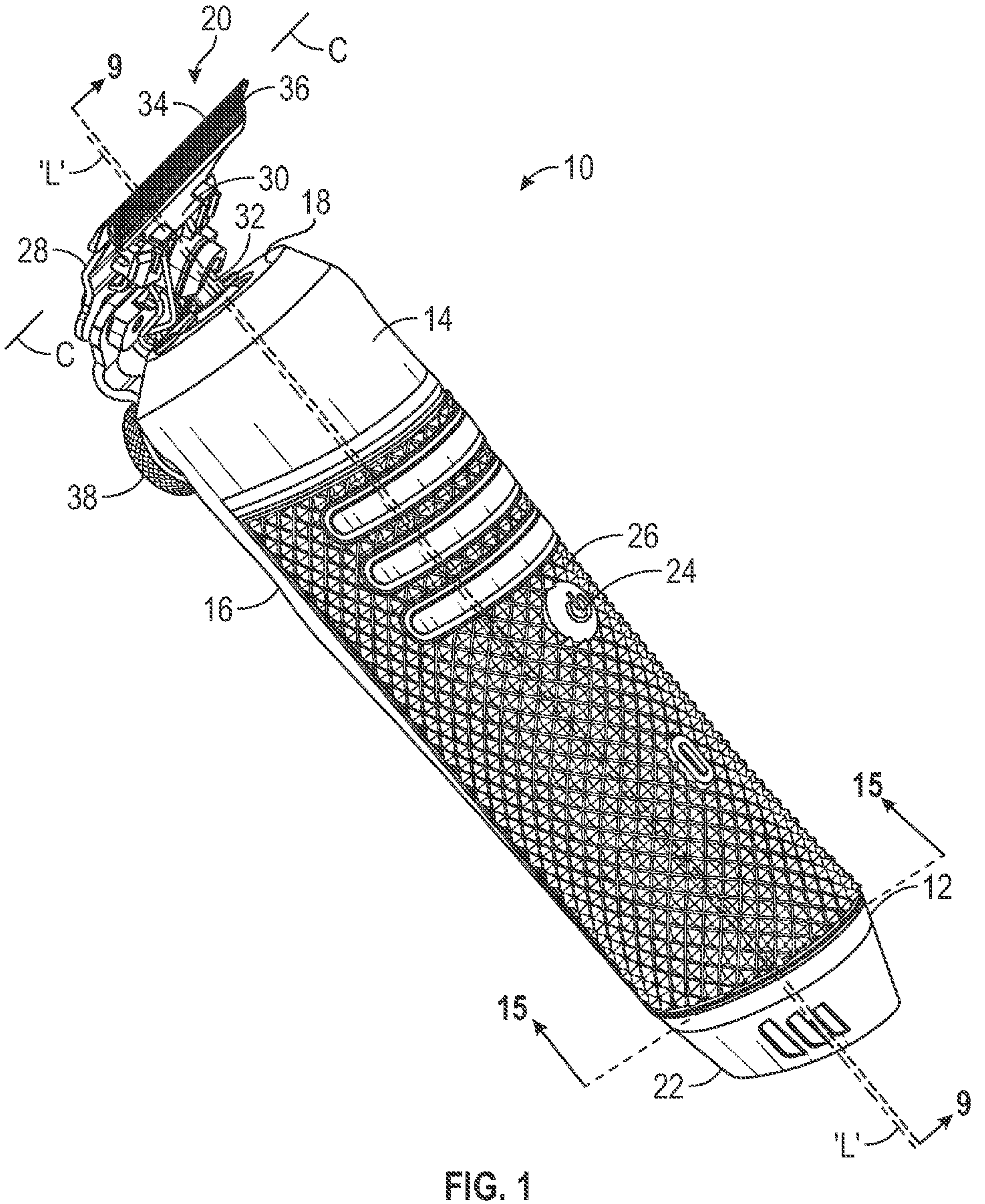
FIG. 1 is a top perspective view of the present hair clipper.

Referring now to FIGS. 1-4, a hair clipper incorporating the present housing configuration and motor pod mounting system is generally designated 10, and includes a housing, generally designated 12 incorporating a first or upper housing half 14 and a second or lower housing half 16. Included on the housing 12 is what is alternately referred to as a front, drive or working end 18, to which is mounted a bladeset 20, and an opposite rear end 22, configured for accommodating a charging cord for recharging an internal battery. A power switch 24 on the first housing half 14 controls the operation of a motor (described below), and in the preferred embodiment, at least one of the first and second housing halves 14, 16 are provided with a grip-enhancing, resilient material 26. In the present embodiment, the grip-enhancing material 26 is textured, however other configurations are contemplated.

Figure 2:
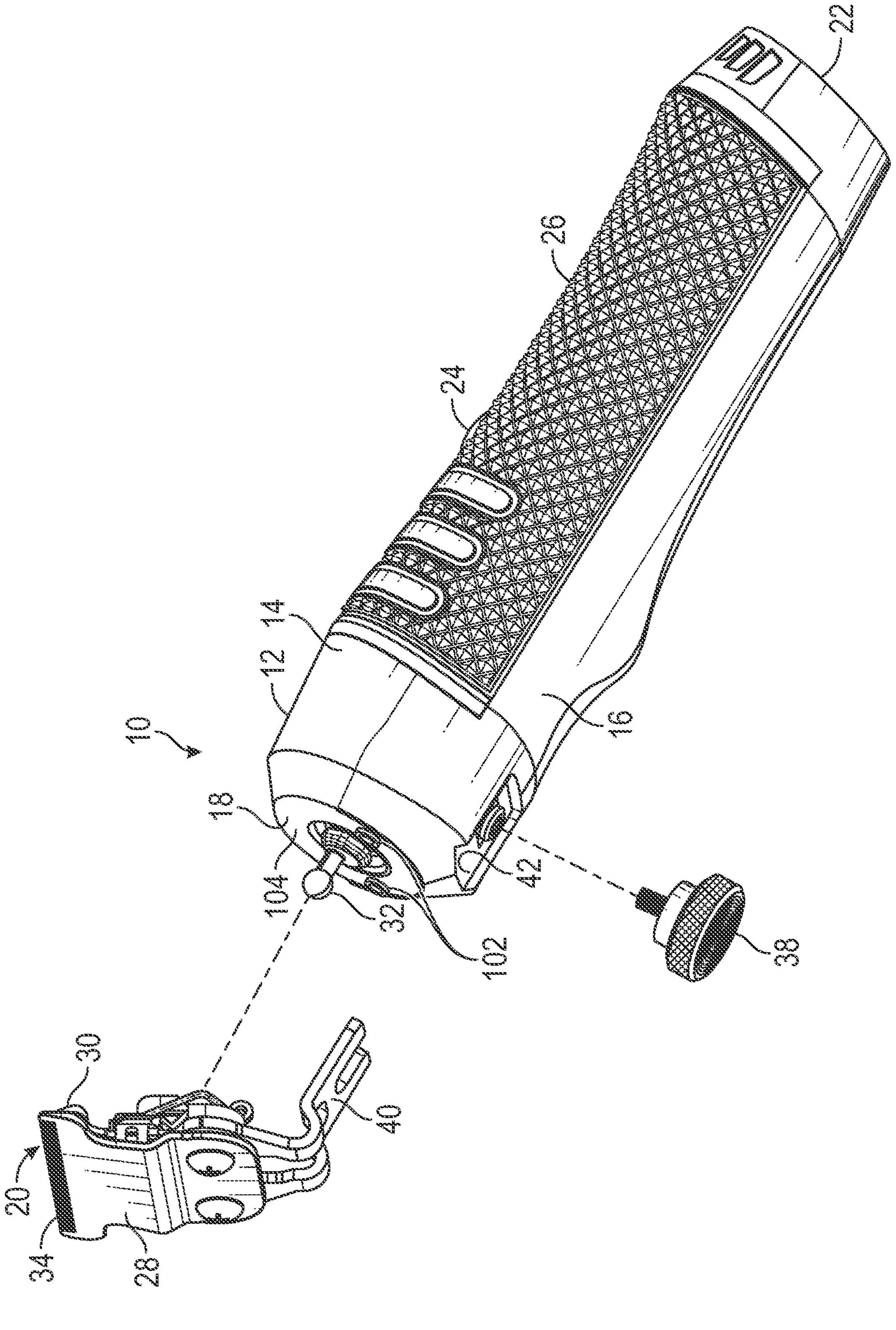
FIG. 2 is a side perspective of the hair clipper of FIG. 1 with the bladeset shown exploded away.
Figure 3:
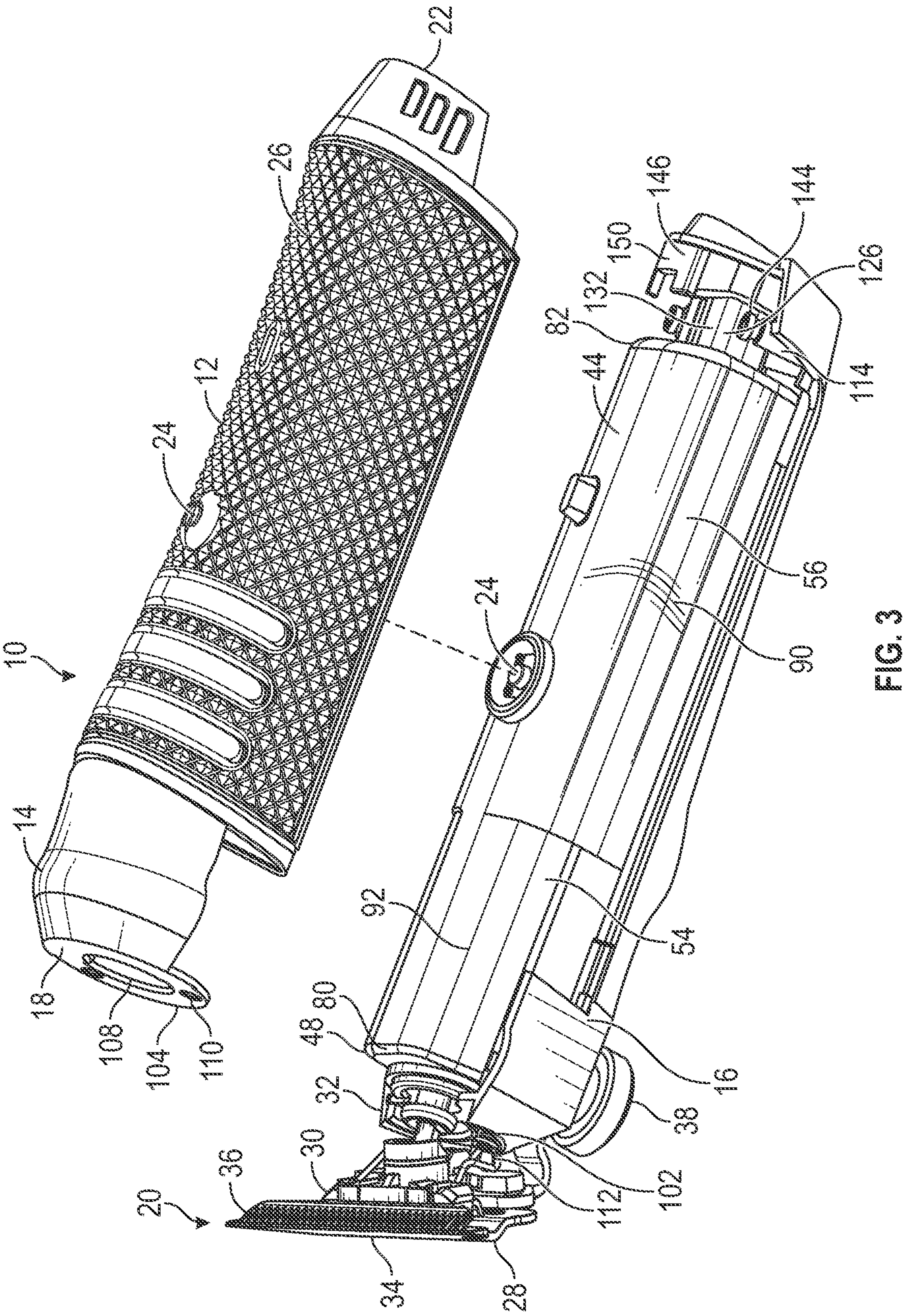
FIG. 3 is an exploded view of the hair clipper of FIG. 1.
Figure 4:
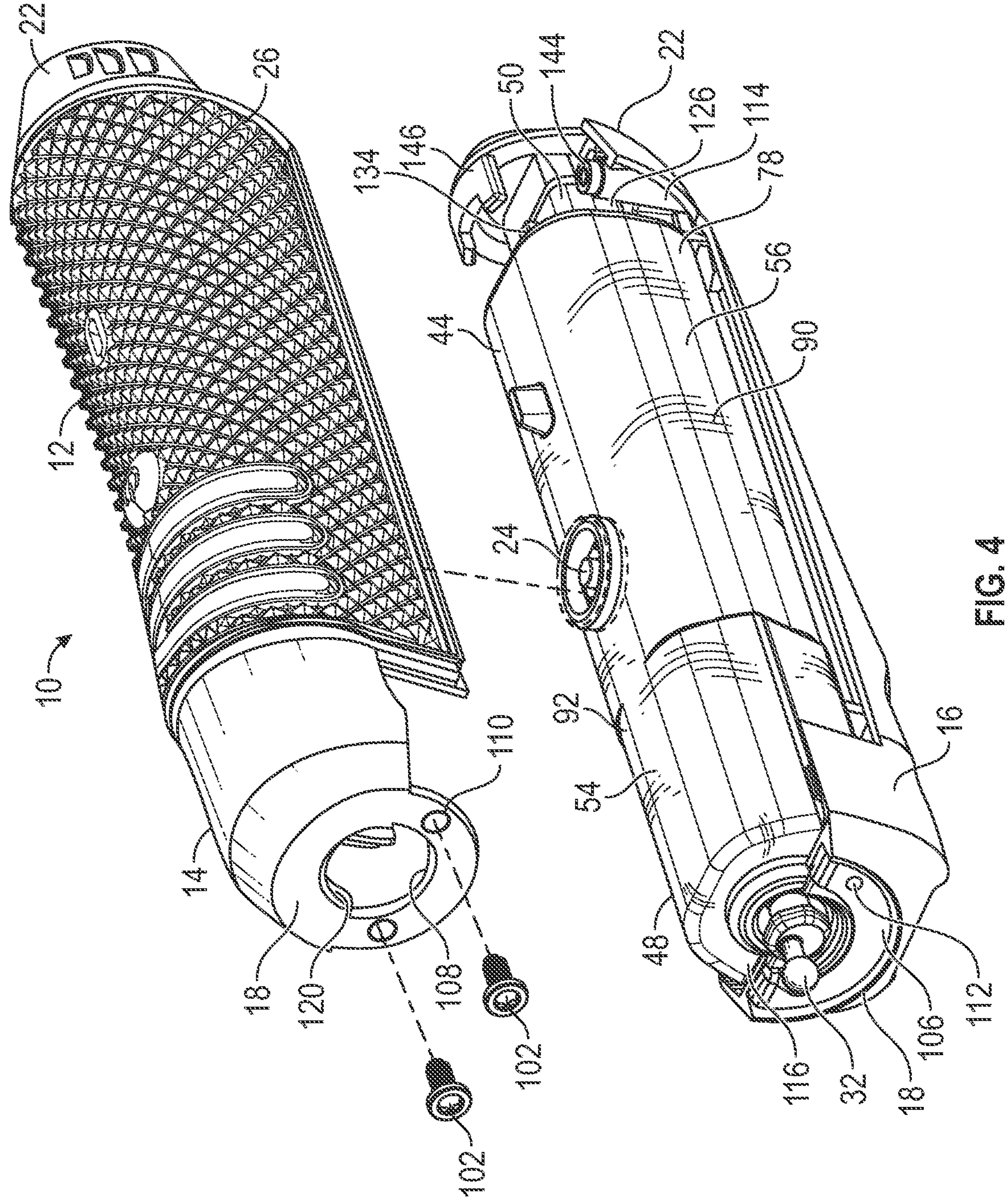
FIG. 4 is a fragmentary front exploded view of the hair clipper of FIG. 1.

The bladeset 20 includes a stationary blade 28 and a laterally reciprocating moving blade 30 driven by an eccentric cam-equipped drive shaft 32. Respective sets of teeth 34 and 36 on the stationary and moving blade 28, 30 form a cutting line "C" that is transverse to a longitudinal housing axis "L". A feature of the housing 12 is that it is configured to have a reduced profile near the bladeset 20 to enhance user visibility of the cutting operation. Also, as seen in FIG. 2, the bladeset 20 is configured for convenient disassembly from the housing 12 using a thumbscrew 38 that retains a bladeset mounting bracket 40 to a recess 42 in the second housing half 16. Details of the construction and operation of the bladeset 20 and the mounting structure are discussed in further detail in commonly-owned U.S. patent application Ser. No. 17/241,895, the contents of which are incorporated by reference herein. While a thumbscrew 38 is shown, it is contemplated that other fastener types could be employed. For non-limiting example, a wing-nut style fastener arrangement could be used, which could also be manipulated by hand without the use of tools.

Referring now to FIGS. 3-6 and 10, the first and second housing halves 14, 16 enclose a motor pod 44 including a chassis, generally designated 46 that is constructed and arranged for placement within the housing 12 and includes a motor end 48 corresponding to the drive end 14, and an opposite charge end 50. Preferably made of injection molded plastic or similar material as known in the art, the chassis 46 includes a plurality of integrally formed mounting formations 52 for retaining in place at least one of a motor 54, a rechargeable battery 56 and a control system 58 preferably taking the form of a circuit board 60 having the power switch 24.

Figure 10:
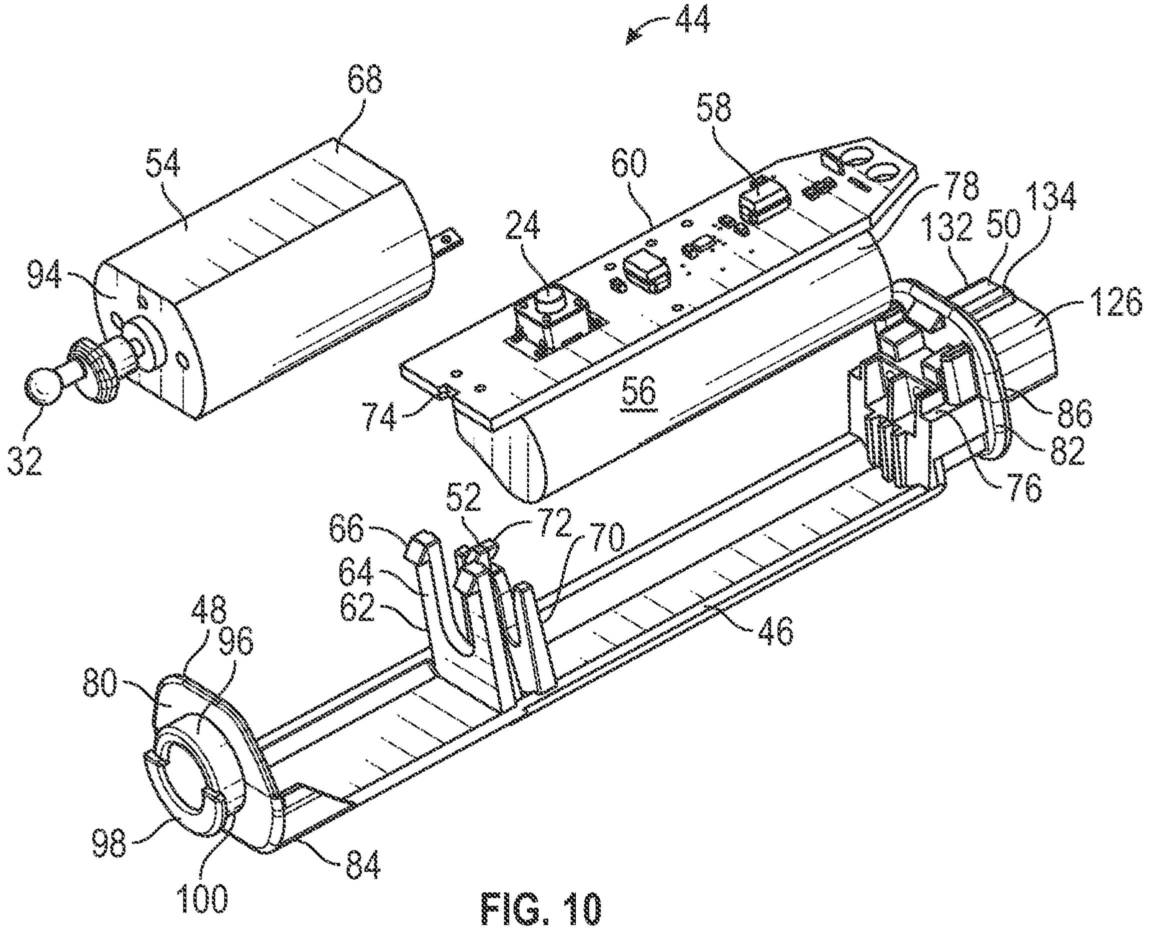
FIG. 10 is an exploded perspective view of the present motor pod.
Figure 11:
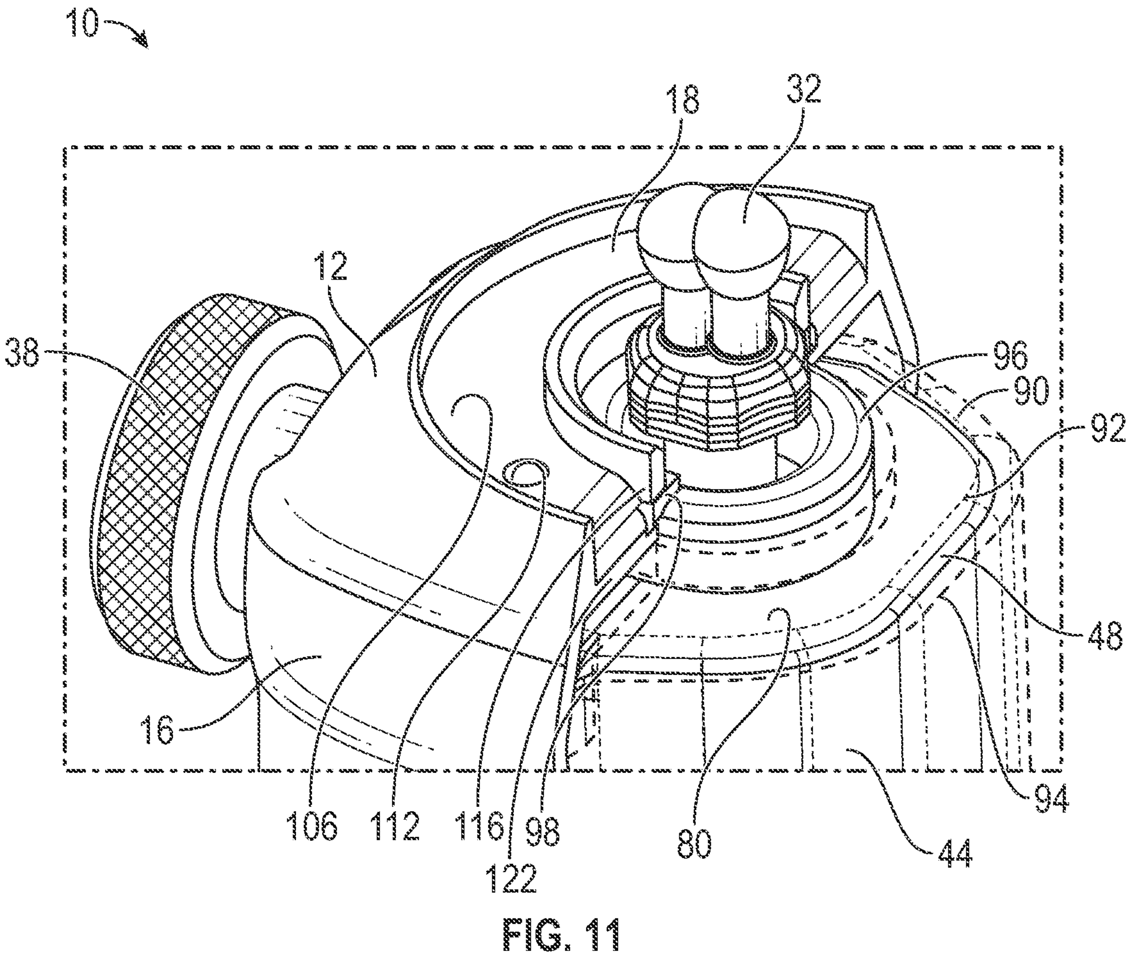
FIG. 11 is a fragmentary top perspective view of the present hair clipper.
Figure 12:
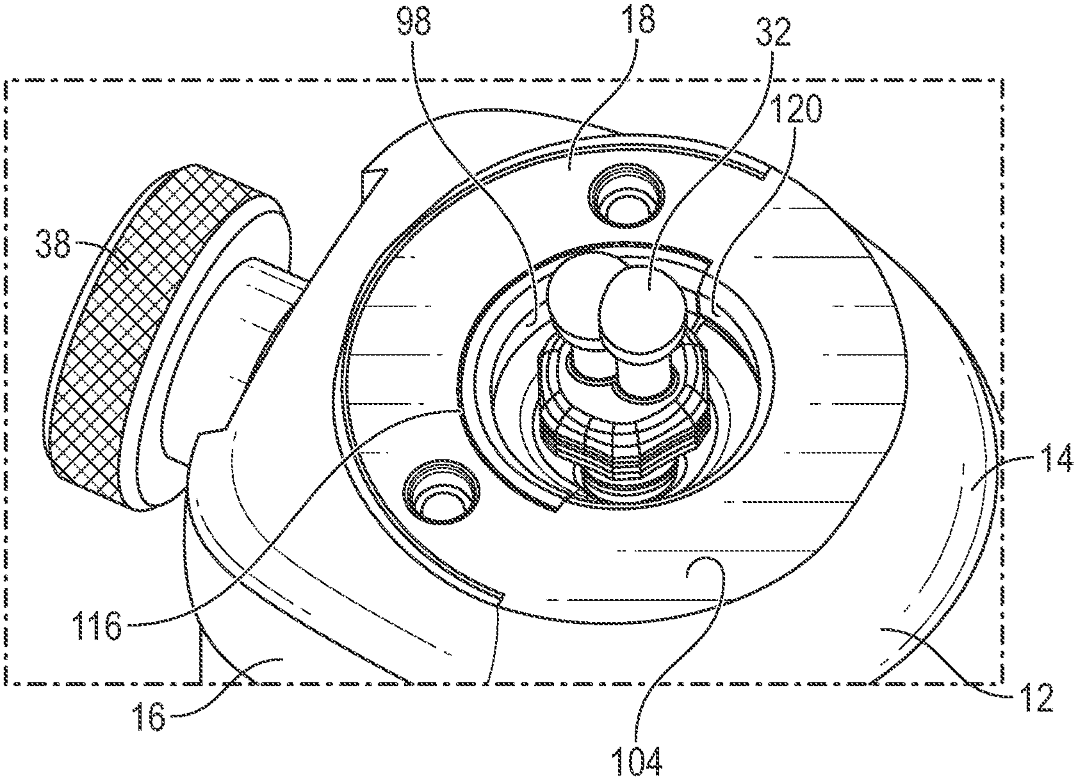
FIG. 12 is a fragmentary top perspective view of the present hair clipper.
Figure 13:
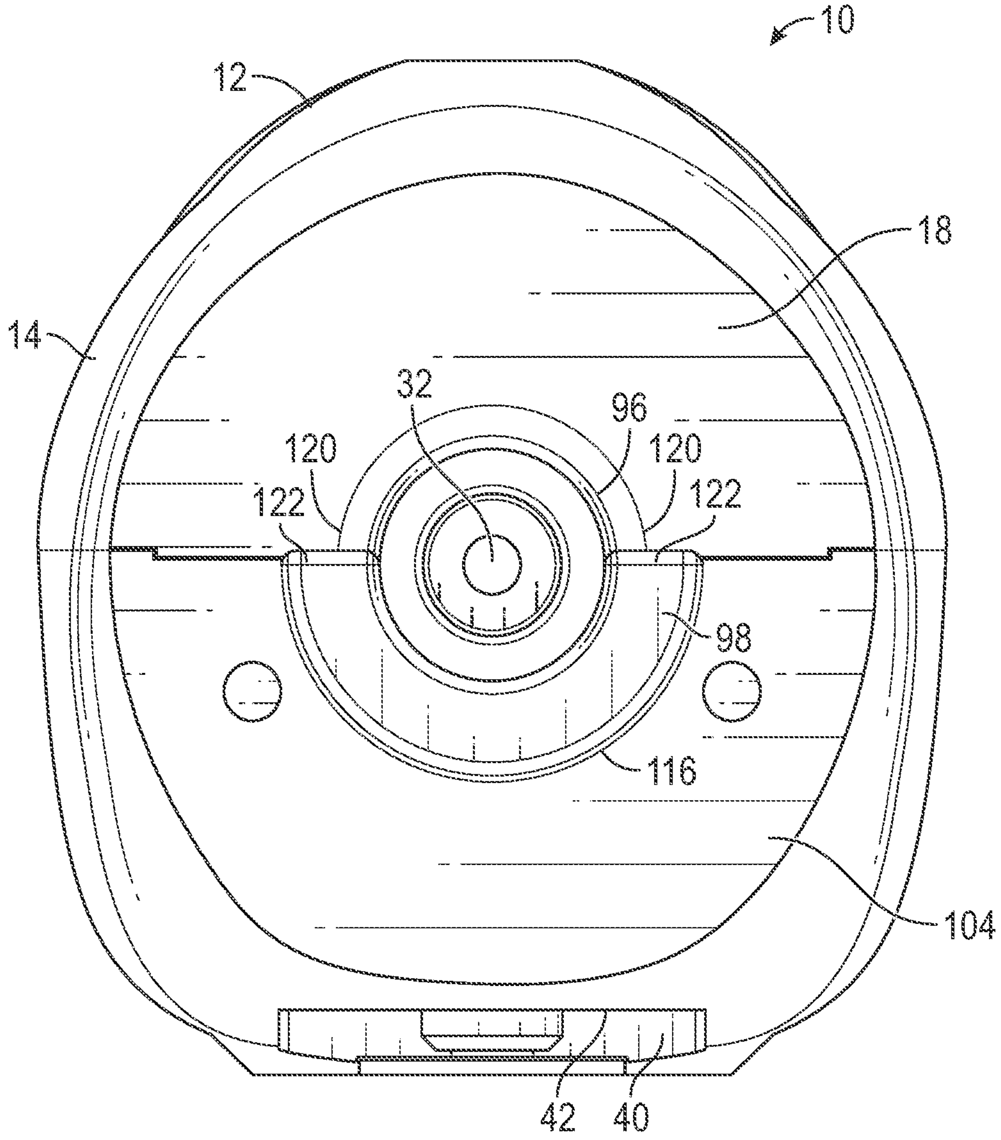
FIG. 13 is a fragmentary front end view of the present hair clipper.
Figure 14:
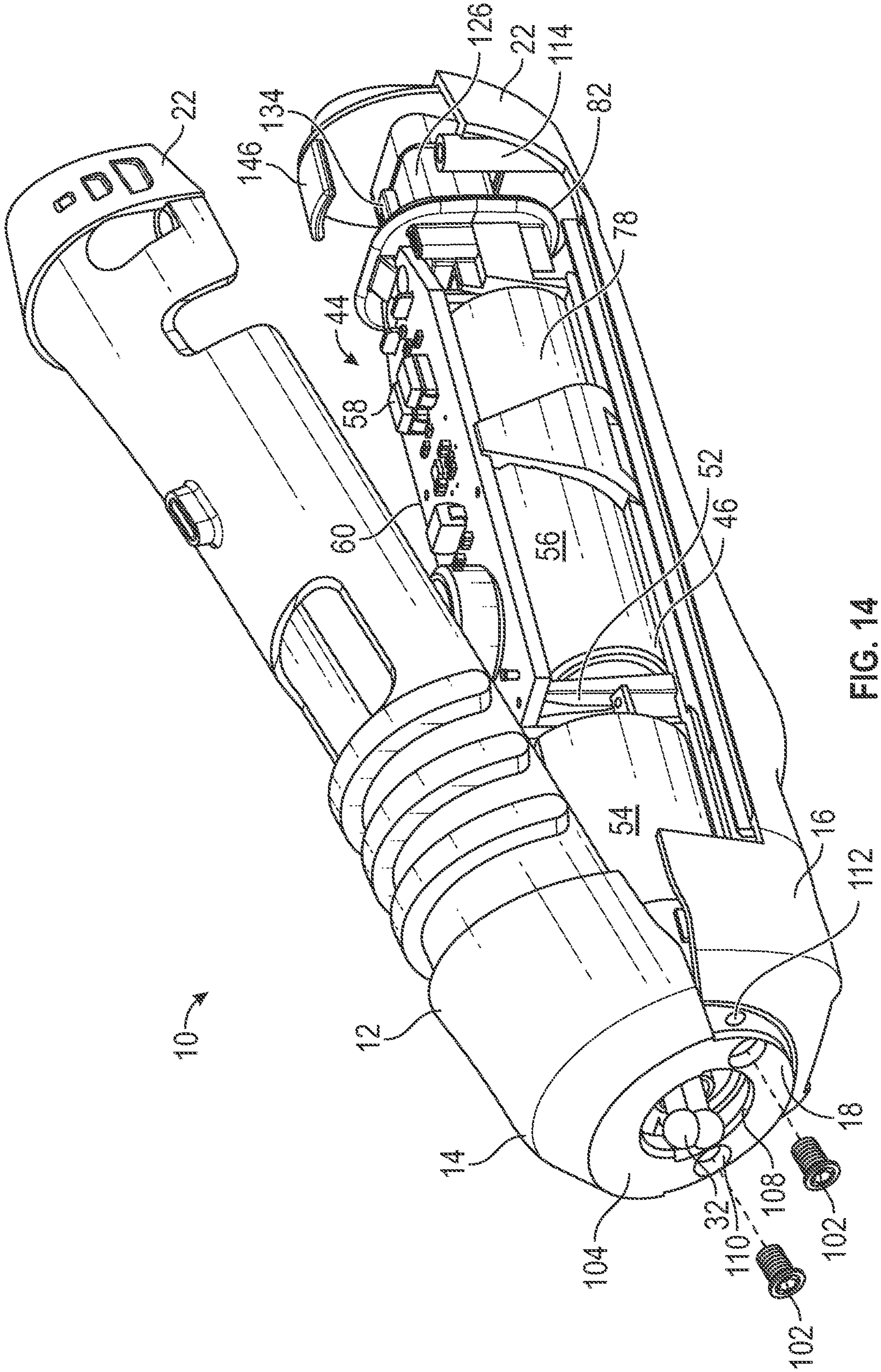
FIG. 14 is a fragmentary top perspective view of the present hair clipper being assembled.

Referring now to FIGS. 10 and 14, included in the mounting formations 52 is a generally vertically-projecting, "U"-shaped motor mount 62 having two arms 64, each of which is provided with a motor retaining tab 66 engaging an exterior 68 of the motor 54 in a snap-fit arrangement. Similar to the motor mount 62, a battery mount 70 is also vertically projecting, slightly rearward of the motor mount, and equipped with a tab or lug 72 configured for engaging a notch 74 on the circuit board 60. A rear battery mount 76 defines a cradle for a rear battery end 78.

Radially enlarged disk-like front and rear seal plates or flanges 80, 82 are affixed to each of front and rear chassis ends 84, 86. The drive shaft 32 projects past the flange 80 at the front end and at least one battery charge pin 88 (FIGS. 9, 15) extends past the rear flange 82.

Figure 5:
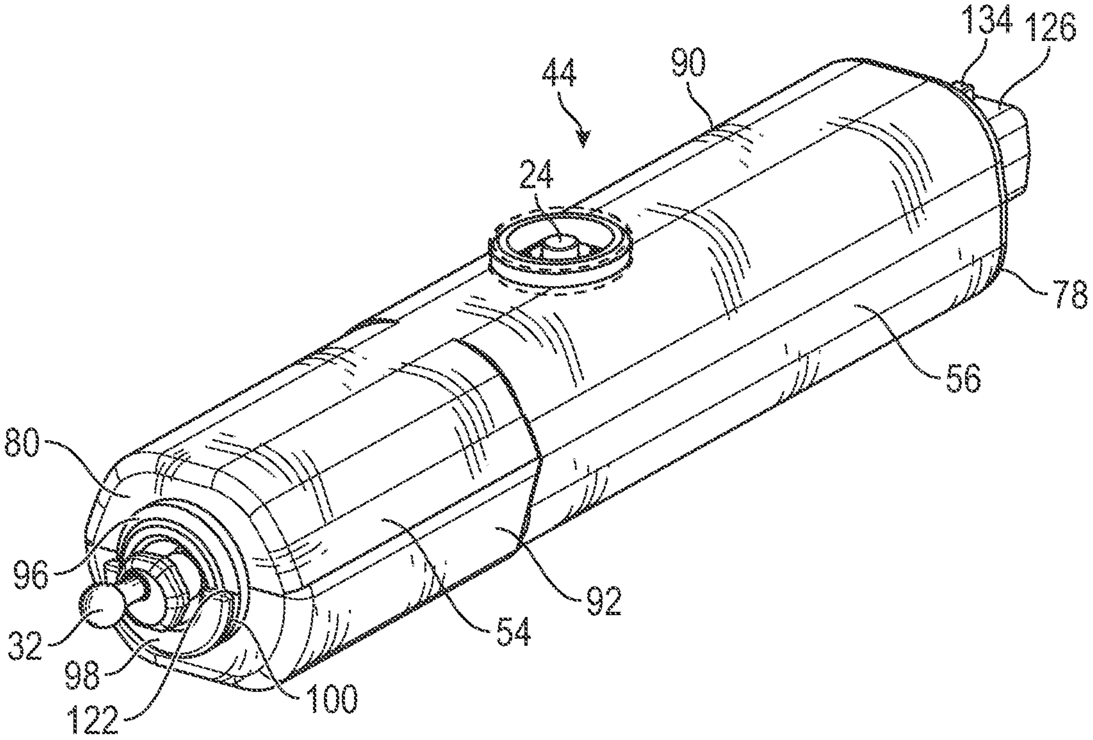
FIG. 5 is a top perspective view of the encased motor pod of the present hair clipper.
Figure 6:
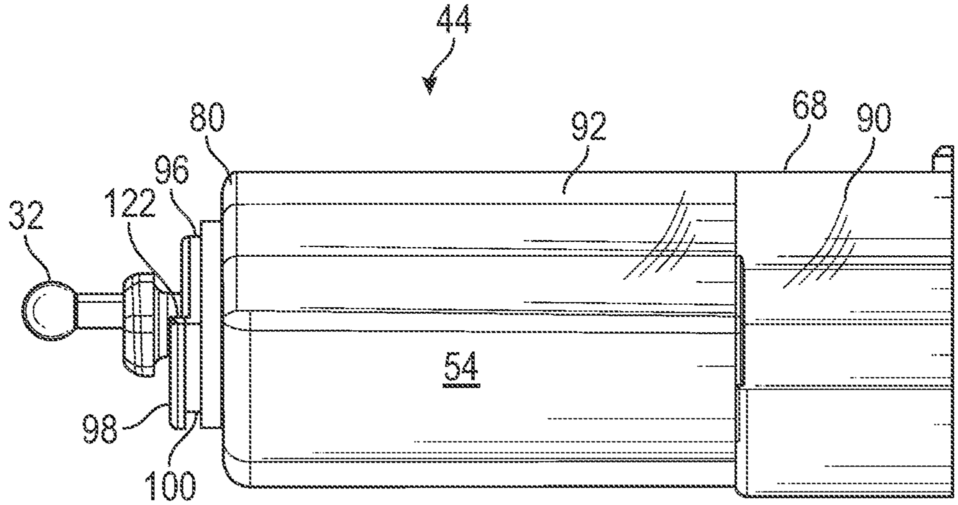
FIG. 6 is an enlarged, fragmentary side view of the motor pod of FIG. 5.
Figure 7:
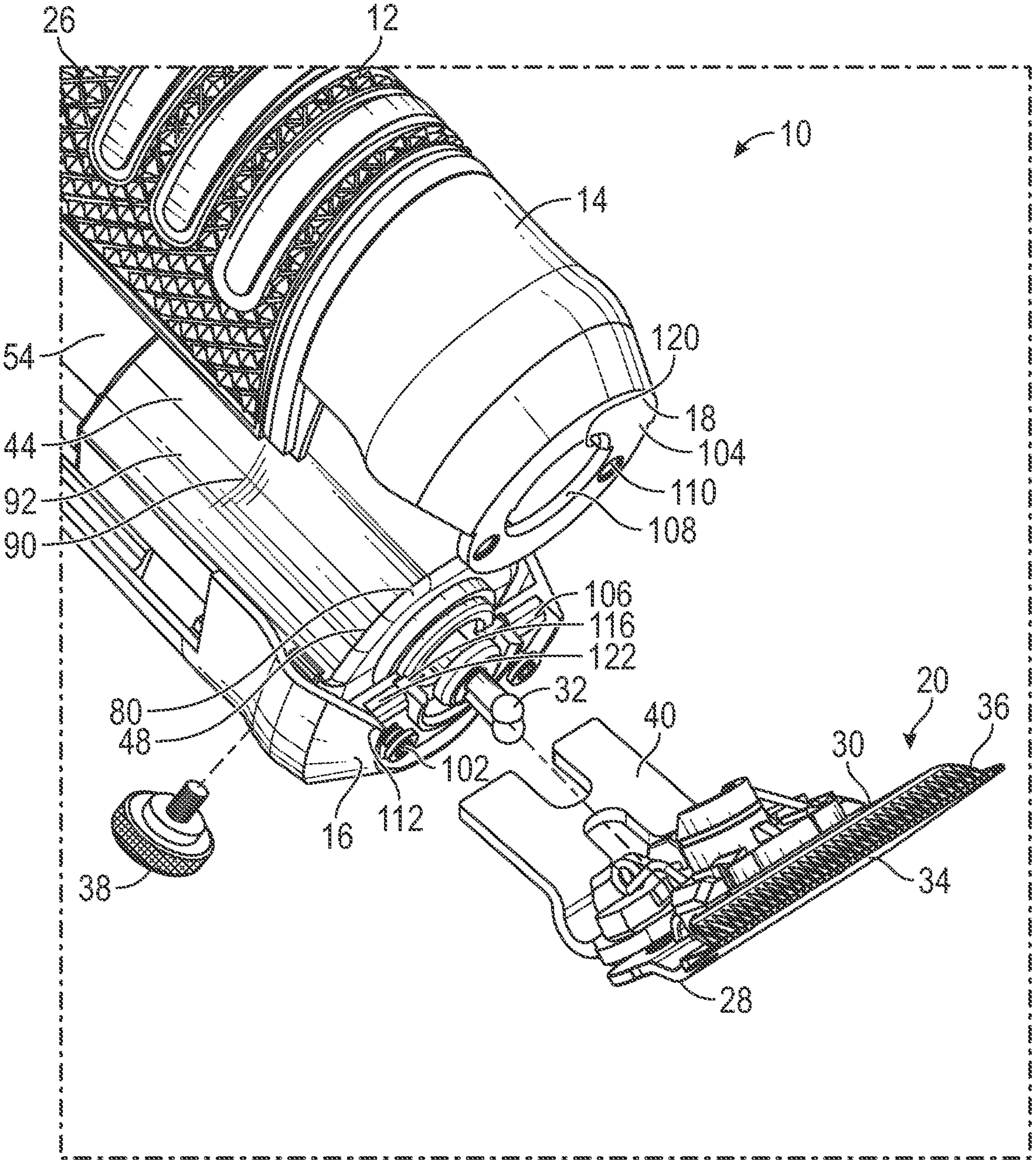
FIG. 7 is an enlarged, fragmentary, exploded perspective view of the present hair clipper.
Figure 8:
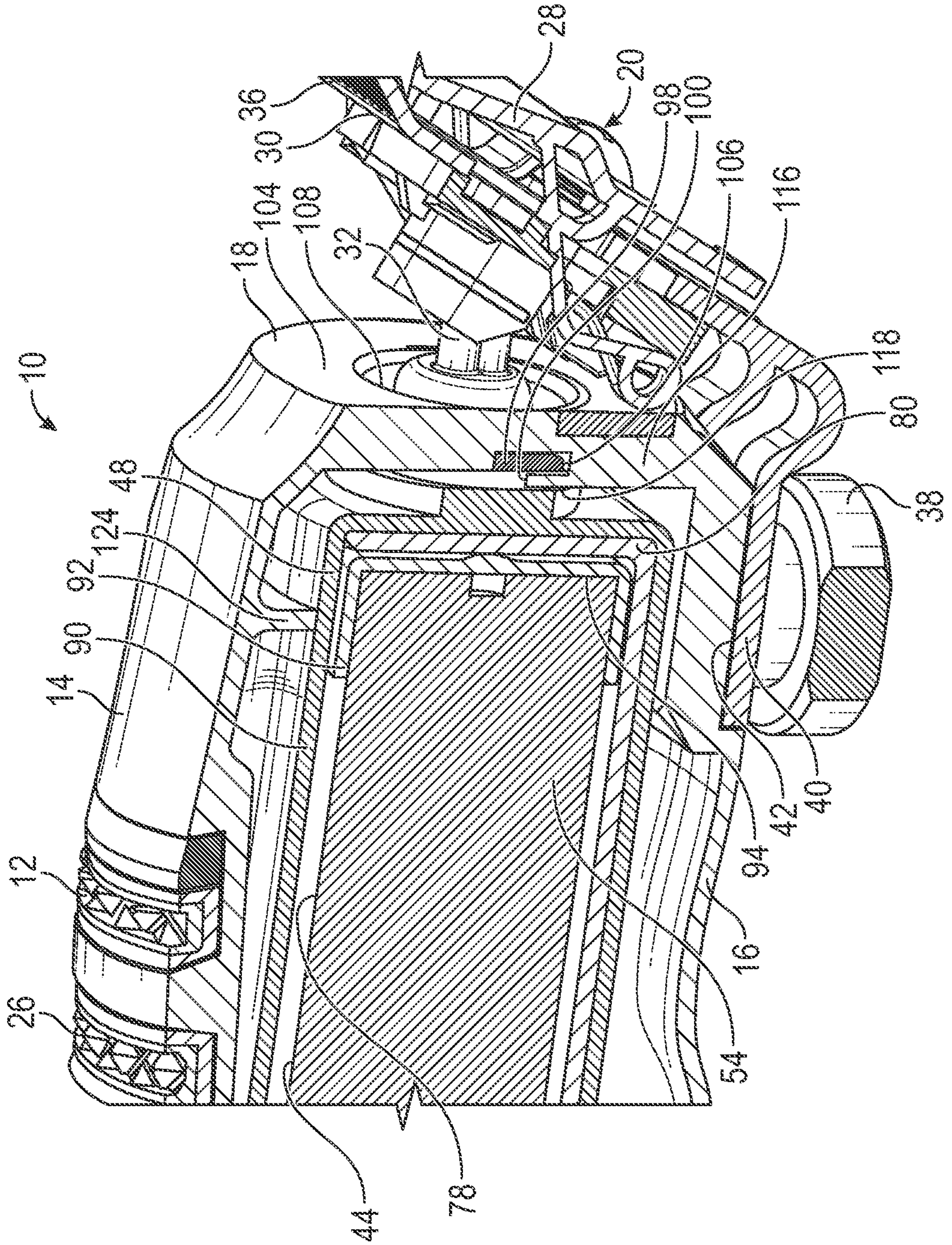
FIG. 8 is a fragmentary vertical cross-section of the present hair clipper.

Referring now to FIGS. 3, 5, 6 and 11, to achieve a desired waterproofing of the motor pod 44 and associated components, a tubular sleeve of shrink wrap film 90 is inserted to surround the chassis 46 and the components mounted thereto 54, 56, 60. The sleeve 90 is dimensioned to have a diameter just larger than a diameter of the flanges 80, 82. Also, the sleeve 90 has a length that extends axially past and overlaps both of the flanges 80, 82. After suitable placement, heat is applied to the sleeve 90 as is known in the art. Conventionally, temperatures in the range of 250-350° F. are applied to cause shrinkage of the shrink wrap film, which is preferably made of plastic polymer. The heat is typically applied using a heat gun or a heat tunnel and a conveyor. As the sleeve 90 shrinks, it attaches to and seals around the flanges 80, 82, and the chassis components 54, 56, 60. FIG. 5 depicts the chassis 46 with the shrunken sleeve 90 encapsulating the chassis and components, forming an internal waterproof enclosure.

As described above, the encapsulating tube or sleeve 90 forms an outer motor seal. To further protect the motor 54 from water damage, the clipper 10 is provided with a further inner motor seal 92 which is a resilient, rubber-like, cup-shaped structure surrounding at least a drive end 94 of the motor. The inner motor seal 92 is also encapsulated by the heat shrink sleeve 90.

Referring now to FIGS. 5, 6, 10, and 13, another feature of the chassis 46 is a chassis pod attachment formation 96 is provided in the form of a semi-circular keying protrusion based on the front flange 80 and having a vertically projecting semicircular flange 98 axially spaced from the chassis and the front flange to form a groove 100. It should be noted that the chassis pod attachment formation 96 is not encapsulated by the sleeve 90.

Referring now to FIGS. 3, 4, 7, 8 and 14, another feature of the present hair clipper 10 is a fastening arrangement configured so that upon assembly, the respective clamshell clipper housing halves 14, 16 are secured together at at least one end by fasteners 102, preferably small screws, inserted along an axis parallel to the longitudinal axis "L" of the clipper housing 12. This arrangement enables the housing 12 to be secured together adjacent the bladeset 20 without the use of conventional vertical bosses oriented perpendicular to the longitudinal clipper housing axis "L". Accordingly, the resulting reduced housing profile at least near the bladeset 20 enhances blade visibility compared to conventional clipper housings.

More specifically, the first, upper housing half 14 has a first attachment formation 104, and the second, lower housing half 16 has a second attachment formation 106. Construction of the attachment formations 104, 106 is such that upon assembly of the housing 12, including the insertion of the fasteners 102 as described above to secure the housing halves 14, 16 together, the encapsulated motor pod 44 is held in place or captured against both rotational and axial linear movement relative to the housing. Further, the configuration of the housing 12 is such that the motor pod 44 is secured in place against movement without piercing the encapsulating sleeve 90 to maintain the water resistant properties.

The first attachment formation 104 defines a loop with an opening 108 accommodating the cammed motor drive shaft 32. Further, the loop 104 is dimensioned to overlap the second attachment formation 106 so that mounting bores 110, 112 on the first and second mounting formations, 104, 106 are in registry with each other for receiving the fasteners 102. It is also contemplated that the lower attachment formation 106 is alternately configured for overlapping the upper attachment formation 104. As will be described in greater detail below, at the rear end 22 of the housing 12, more traditional transverse mounting bosses 114 are used to secure the first and second housing halves 14, 16 together via fasteners 142 (FIG. 15) which extend into the bosses 114 transverse to the longitudinal axis L. It has also been found that with the use of fasteners and bosses 114, and the engagement of the first and second mounting formations 104, 106 as described above, the fasteners 102 which extend parallel to longitudinal axis L may be omitted entirely with a tight connection between the first and second housing halves maintained. The inclusion of the fasteners 102, however, provides an additional level of securement.

Referring now to FIGS. 3, 4, 7, 8, 11 and 13, each of said first and second housing halves 14, 16 have locking formations that engage the pod attachment formation 96 to prevent movement of the motor pod 44 relative to the assembled housing in both a rotational and a linear direction. These locking formations include on the second housing half 16, a semi-circular recessed cradle formation 116 configured for accommodating the semi-circular flange 98, and also having a rib 118 (FIG. 8) engaging the groove 100. Once the pod attachment formation 96 is seated in the cradle formation 116, the motor pod 44 is unable to move along the housing axis "L".

Further, on the first housing half 14, a pair of depending shoulders 120 located behind the loop 104 are configured to engage ends 122 (FIGS. 10 and 14) of the vertical flange 98. Upon the first and second housing halves 14, 16 being secured together about the motor pod 44, the engagement of the shoulders 120 on the flange ends 122 prevent the motor pod from rotating. In the preferred embodiment, the first housing half 14 is also provided with at least one clamping rib 124 (FIGS. 8 and 9) that is dimensioned to provide supplemental clamping force on the motor pod 44 upon assembly of the housing halves 14, 16 together.

Figure 9:
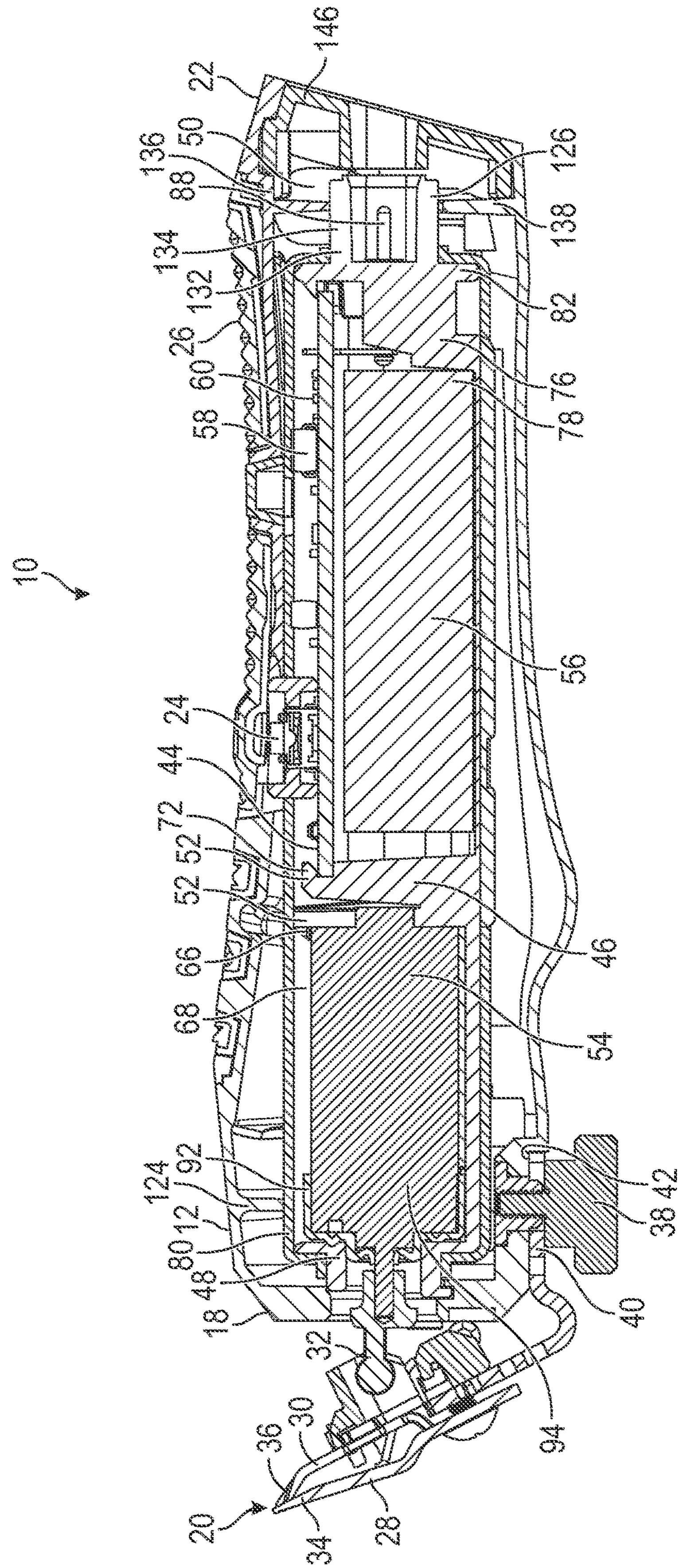
FIG. 9 is a vertical cross-section taken along the line 9-9 of FIG. 1 and in the direction generally indicated.
Figure 15:
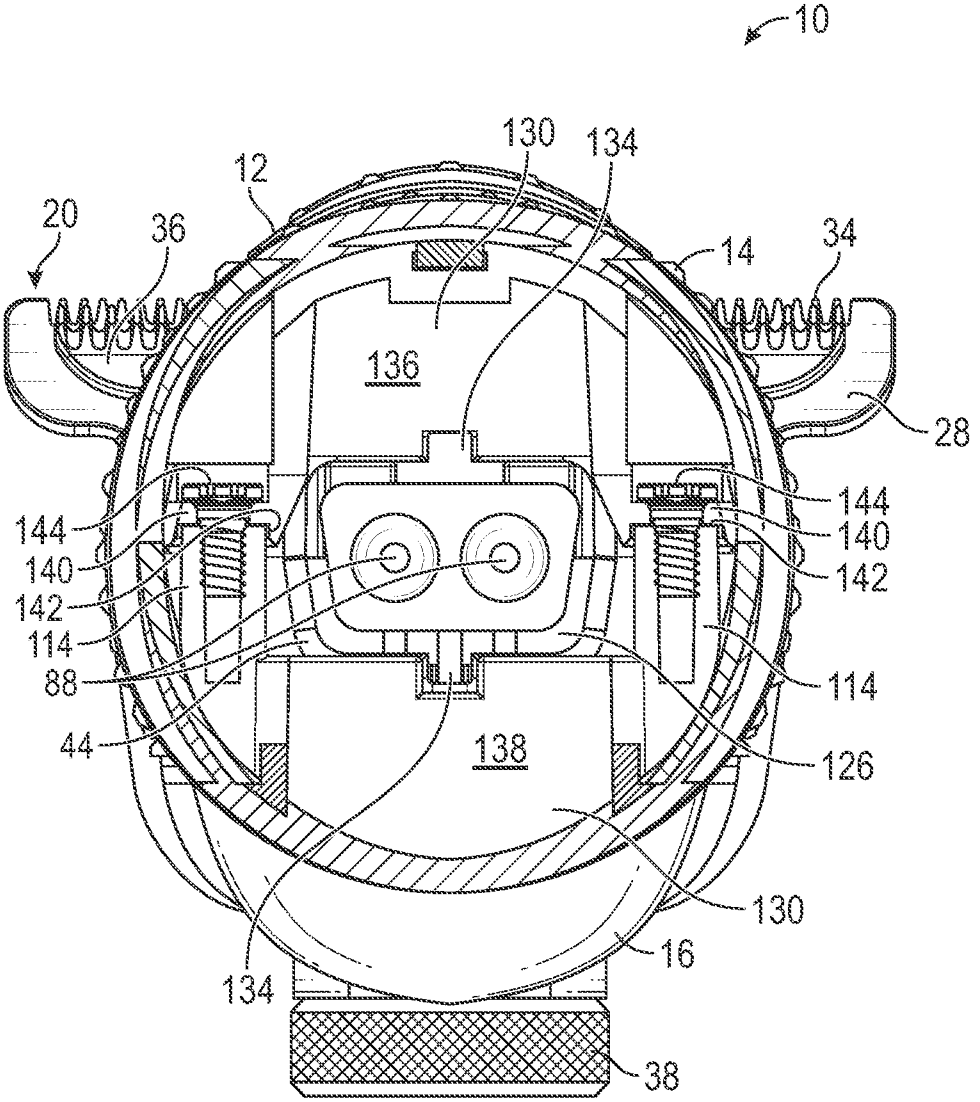
FIG. 15 is a cross-section taken along the line 15-15 of FIG. 1 and in the direction generally indicated.

Referring now to FIGS. 9, 10 and 15, the rear seal plate or flange 82 of the chassis 46 defines a polygonal shaped charging cowl 126 configured for being retained by the juncture of the first and second housing halves 14, 16 to retain the motor pod 44 in place at the rear end 22 of the housing 12 against operation-induced movement. Also, the charging cowl 126 encloses the rearwardly-projecting battery charge pins 88. As occurred at the drive end 18 of the clipper housing 12, at the opposite rear end 22, the first and second housing halves 14, 16 include formations 130 configured, upon housing assembly, for retaining a rear end 132 of the motor pod 44 against movement relative to the housing during clipper operation.

Retention of the motor pod 44 is enhanced by the provision of a locating rib 134 on upper and lower surfaces of the charging cowl 126. These ribs 134 are matingly engaged by respective bulkheads 136, 138 in the first and second housing halves 14, 16. Further, the vertical bosses 114, which are integrally formed on the second housing half 16, are engaged in a clamping arrangement by depending bulkhead extensions 140 which define boss notches 142 configured for accommodating the bosses 114. Rear housing fasteners 144, preferably threaded screws, hold the housing halves 14, 16 together at the rear housing end 22 to thus clamp the motor pod 44 in place.

Referring now to FIGS. 14 and 15, during assembly of the clipper 10, after insertion of the encapsulated motor pod 44 and before attachment of the bladeset 20, the first housing half 14 is positioned at an obtuse angle to the second housing half 16 so that the loop 104 encircles the cammed drive shaft 32 and the loop opening 108 accommodates the shaft. Also during this operation, the shoulders 120 on the first housing half 14 will come in contact with the ends 122 of the flange 98. As the first and second housing halves 14, 16 are brought together, a rear housing endcap 146 is also captured between the housing halves for ornamental purposes.

Once the drive end 18 of the housing 12 is in registry, the rear end 22 of the first housing half 14 is lowered onto the second housing half 16. At this time, the formations 130 are placed in clamping position about the charging cowl 126, and the fasteners 102 and 144 are inserted to secure the housing 12 together to retain the motor pod against operational movement without piercing the encapsulating sleeve 90. Upon assembly of the housing halves 14, 16, the bladeset 20 is secured using the thumbscrew 38.

While a particular embodiment of the present hair clipper housing with enhanced motor mount has been described herein, it will be appreciated by those skilled in the art that changes and modifications may be made thereto without departing from the invention in its broader aspects and as set forth in the following claims.

The invention claimed is:

1. A hair clipper including a motor having a drive shaft configured for driving a laterally reciprocating moving blade relative to a stationary blade, said blades each having respective sets of teeth defining a cutting line, said hair clipper comprising:

a clipper housing defining a longitudinal housing axis, having a drive end and including a first housing half and a second housing half, each of said halves having a front end associated with said drive end and an opposite rear end;

each said front end defining an attachment formation;

upon assembly of said clipper housing halves, said first and second housing halves are constructed so that said attachment formations are overlapping and are secured using fasteners inserted along a longitudinal axis parallel to said longitudinal housing axis;

a chassis configured for securing the motor, a battery and a control system, a radially enlarged flange at each of said ends;

a tubular sleeve of heat deformable plastic film dimensioned for slidingly surrounding said chassis and extending axially at least to said flanges, such that upon application of heat, said sleeve deforms around said chassis, said motor, said battery and said control system, and forms a sealed motor pod;

said chassis including a pod attachment formation configured for being engaged by said attachment formations of said first and second housing halves for preventing movement of said pod relative to said housing upon assembly of said first and second housing halves.

2. The hair clipper of claim 1, wherein each of said first and second housing halves have locking formations that engage the pod attachment formation to prevent movement of the motor pod relative to the assembled housing in both a rotational and a linear direction.

3. The hair clipper of claim 2, wherein attachment of said first and second housing halves using said fasteners oriented parallel to the longitudinal axis of the clipper secure said two housing halves together and also capture said encapsulated motor pod.

4. The hair clipper of claim 1, wherein said chassis pod attachment formation is provided in the form of a semi-circular keying protrusion having a vertically projecting semicircular flange axially spaced from the chassis to form a groove.

5. The hair clipper of claim 4, further including said second housing half has a semi-circular cradle formation configured for engaging said groove, and said first housing half has a pair of shoulders that engage ends of said flange, and upon said first and second housing halves being secured together, said shoulders prevent said motor pod from rotating, and the engagement of said groove with said cradle prevents axial movement of said motor pod in said housing.

6. The hair clipper of claim 1, wherein said encapsulating tube forms an outer motor seal, and said clipper is provided with a further inner motor seal surrounding at least a drive end of said motor.

7. The hair clipper of claim 1, further including integral tabs on said chassis configured for retaining at least one of said motor and said battery upon said chassis.

8. The hair clipper of claim 1, further including a front seal plate of said chassis provides a front attachment point for said encapsulating tube upon heat sealing, and also forms a base for the semi-circular keying protrusion, and a rear seal plate of said chassis provides a rear attachment point for said encapsulating tube upon heat sealing, said rear seal plate defines a polygonal shaped charging cowl configured for being retained by the juncture of said first and second housing halves to retain said motor pod in place in the housing against operation-induced movement.

9. The hair clipper of claim 1, further including formations on said first and second housing halves for retaining a rear end of said motor pod from movement relative to said housing upon assembly of said first and second halves.

* * * * *